Patented Mar. 26, 1929.

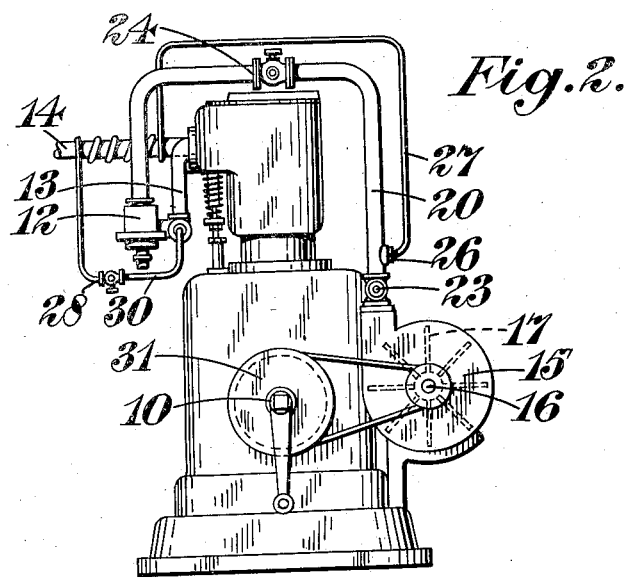
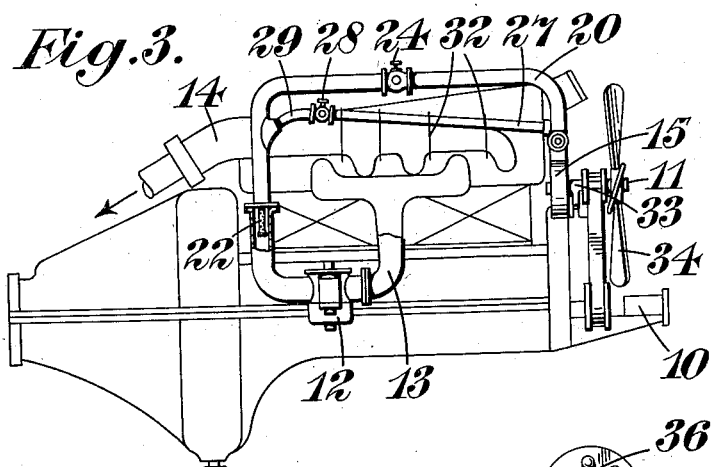
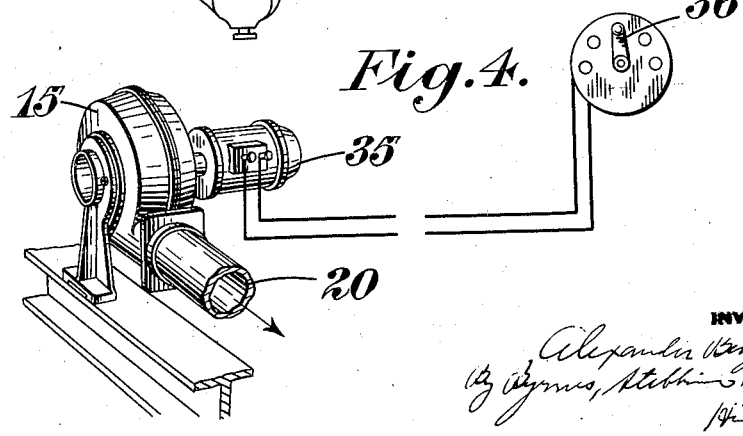

1,706,391

UNITED STATES PATENT OFFICE.

ALEXANDER BENJAMIN, OF FOLKESTONE, ENGLAND.

MEANS FOR SUPPLYING AIR TO INTERNAL-COMBUSTION ENGINES.

Application filed May 13, 1925, Serial No. 29,956, and in Great Britain September 19, 1924.

This invention is for improvements in or relating to the supply of air to internal combustion engines and has for its object to provide for more efficient and economical working of said engines. The invention will enable a saving in fuel and lubricating oil to be effected, and also will keep the interior of the cylinders clean and reduce harmful exhaust fumes.

The primary feature of the invention consists in the provision, in or for an internal combustion engine, of a device for supplying heated air under pressure to an air intake of the engine. The air may be heated by the engine exhaust conduit and may be supplied to any preferred air intake such as the carburetor intake or directly to the induction pipe. In order to suit varying conditions the device may be also arranged to be capable of supplying, when desired, cold air under pressure to the aforesaid air intake.

It is preferred that the pressure at which the air is supplied to the air intake shall be variable, and the air-compressing device may be driven by the engine and vary the pressure developed in accordance with the speed of the engine, or it may be driven independently of the engine but under the control of a device for securing variable speed.

For a more complete understanding of the invention there will now be described, by way of example only and with reference to the accompanying drawings, certain constructional forms of apparatus according to the invention. It is to be understood, however, that the invention is not restricted to the precise constructional details set forth.

In these drawings:—

Figure 2 is a somewhat similar view showing the invention applied to a stationary engine.

Figure 3 is a view corresponding somewhat to Figure 1 but showing the invention applied to a different type of vehicle engine, and Figure 4 is a perspective view, also somewhat of a diagrammatic nature, showing electrical means for driving the air-compressing device.

Like reference numerals indicate like parts throughout the drawings.

Figure 1:
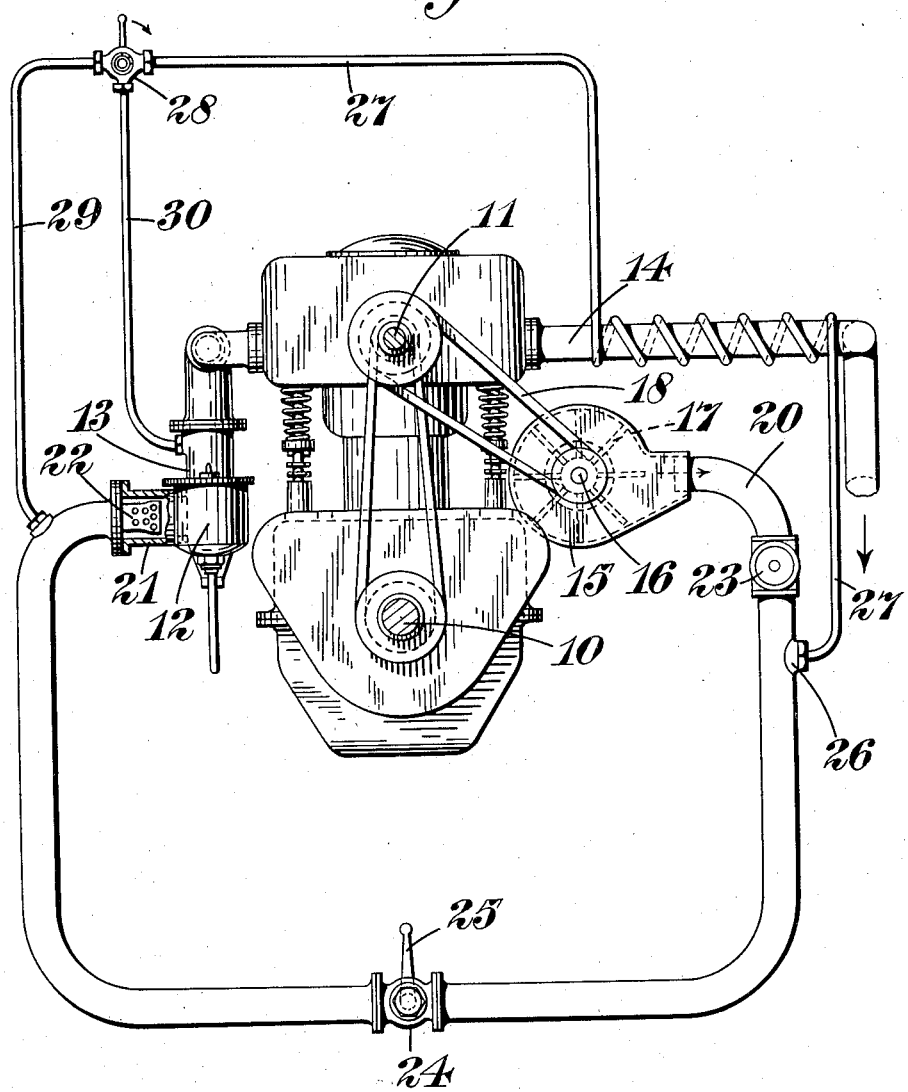
Figure 1 is an elevation, of a diagrammatic nature, and partly in section, of one constructional form of apparatus according to the invention as applied to a vehicle engine.

Referring firstly to Figure 1, the engine crankshaft is shown at 10, the radiator fan shaft at 11, the carburetor at 12, the induction pipe at 13 and the exhaust conduit at 14. Supported in a suitable manner adjacent to the engine is a blower 15 whereof the shaft 16 carrying the vanes 17 is driven by a belt 18 from the radiator fan shaft 11. Preferably the vanes are accessible and detachable in order that the effect of the blower may be adjusted to requirements. The blower 15 delivers air under pressure into a pipe 20 which leads to the air intake 21 of the carburetor and to ensure cleanliness of the air it may be drawn through a gauze (not shown in the drawings). Inside this air intake 21 the pipe 20 terminates in a perforated nozzle 22 from which the air issues in a plurality of fine streams or jets. The pipe 20 is fitted with a relief valve 23 and with a stop cock 24 whereof the controlling lever 25 may be operated from any prefered situation. Leading from a boss 26 on the pipe 20 is a branch pipe 27 which after being coiled around the exhaust conduit 14 leads to a three-way valve 28. Also communicating with this three-way valve are other pipes 29 and 30, the former leading to the pipe 20 adjacent to the situation of the air intake to the carburetor, and the pipe 30 leading to the engine induction pipe 13 on the engine side of the carburetor. By means of the three-way valve 28 it is possible to direct the air from the branch pipe 27 either down the pipe 29 or the pipe 30, or it is possible to shut it off altogether.

In operation, it will be seen that as the engine runs, the blower or fan will supply air under pressure either to the pipe 20 alone or to the pipe 27 alone or to both of these pipes according to the setting of the valves. The speed of the fan will vary directly with the speed of the engine and consequently it will be assured that ample compression will be secured in the engine cylinders of hot, warm or cold carbureted air as required.

Referring now to Figure 2, the engine therein shown has no radiator fan, so the drive for the blower 15 is taken from a pulley 31 on the engine crankshaft. The arrangement of the conduits for leading the air to the engine is substantially the same as shown in Figure 1 save that the pipe 29 is shown as being omitted, though it may be included if desired.

In the construction shown in Figure 3, the arrangement of the conduits supplying the air is substantially the same as in Figure 1 so that the pipe 30 is shown as being omitted.

It may, however, be included if desired. In Figure 3 the hot air pipe 27 instead of being wound around the exhaust pipe 14 is led along the latter and may be secured thereto by ties 32. The blower 15 is mounted directly upon the radiator fan shaft 11, but on the opposite side of the bearing 33 to that upon which the radiator fan 34 is mounted.

In the constructions shown in Figures 1, 2 and 3 the blower 15 will vary in speed directly with the speed of the engine shaft since it is directly or indirectly driven by the latter. In the construction shown in Figure 4, however, the blower 15 is driven independently of the engine crankshaft, since an electric motor 35 is provided which is controlled by a switch 36 having a number of different settings according to the speed at which it is desired that the motor shall drive the blower. The pipes and pipe connections have not been illustrated in Figure 4, but they may be in accordance with any of the preceding figures.

By the employment of the present invention a regular and efficient explosive mixture can be fed to the engine, and the liability of erratic working due to atmospheric changes is eliminated, the invention because of this, being particularly applicable for use in aircraft.

It is to be understood that the invention is not limited to the precise constructional details set forth.

I claim:—

An internal combustion engine having an induction pipe leading from a carburetor, an air intake, leading to the carburetor, means for supplying air under pressure to said air intake, means for supplying heated air under pressure to said air intake, means for supplying heated air under pressure to said induction pipe, and means for controlling the flow to both of said air intake means.

In testimony whereof I affix my signature.

ALEXANDER BENJAMIN.